United States Patent
Choi et al.

(10) Patent No.: US 8,139,589 B2
(45) Date of Patent: Mar. 20, 2012

(54) GATEWAY APPARATUS FOR PROVIDING MULTI-CHANNEL FUNCTIONALITY IN SENSOR NETWORK, AND METHOD AND APPARATUS FOR INTERFACING USING SERIAL PERIPHERAL INTERFACE IN THE GATEWAY APPARATUS

(75) Inventors: Byeong Cheol Choi, Daejeon (KR); Bong Wan Kim, Daejeon (KR); Bong Soo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 965 days.

(21) Appl. No.: 12/155,137

(22) Filed: May 29, 2008

(65) Prior Publication Data

US 2009/0147710 A1    Jun. 11, 2009

(30) Foreign Application Priority Data

Dec. 6, 2007  (KR) .................. 10-2007-0126372

(51) Int. Cl.
*H04L 12/28* (2006.01)
(52) U.S. Cl. ....................................... 370/401
(58) Field of Classification Search ............... None
See application file for complete search history.

(56) References Cited

U.S. PATENT DOCUMENTS

| 2004/0123149 A1 | 6/2004 | Tyroler |
| 2004/0235468 A1* | 11/2004 | Luebke et al. ............ 455/426.1 |
| 2007/0058634 A1 | 3/2007 | Gupta et al. |
| 2007/0060147 A1* | 3/2007 | Shin et al. .................. 455/445 |

FOREIGN PATENT DOCUMENTS

| KR | 20-0331393 | 10/2003 |
| KR | 10-2007-0059852 | 6/2007 |

OTHER PUBLICATIONS

Korean Office Action issued Nov. 18, 2009 in corresponding Korean Application No. 10-2007-0126372.
Korean Office Action issued on May 28, 2009 in corresponding Korean Patent Application 10-2007-0126372.

* cited by examiner

*Primary Examiner* — Raj Jain
(74) *Attorney, Agent, or Firm* — Staas & Halsey LLP

(57) ABSTRACT

Provided are a gateway apparatus for providing multi-channel functionality in a sensor network, and a method and an apparatus for interfacing using serial peripheral interface (SPI) in the gateway apparatus. The SPI interfacing apparatus is connected to a plurality of wireless transmit/receive units, and receives a data frame via an SPI to output the data frame to a wireless transmit/receive unit, based on information regarding selection of the wireless transmit/receive unit, wherein the information is contained in the data frame. Then, the SPI interfacing unit receives data frames from the wireless transmit/receive units to output the data frames in a predetermined order via an SPI. Thus, the wireless transmit/receive units for providing multi-channel functionality can interface a signal processing unit by using an SPI method.

6 Claims, 7 Drawing Sheets

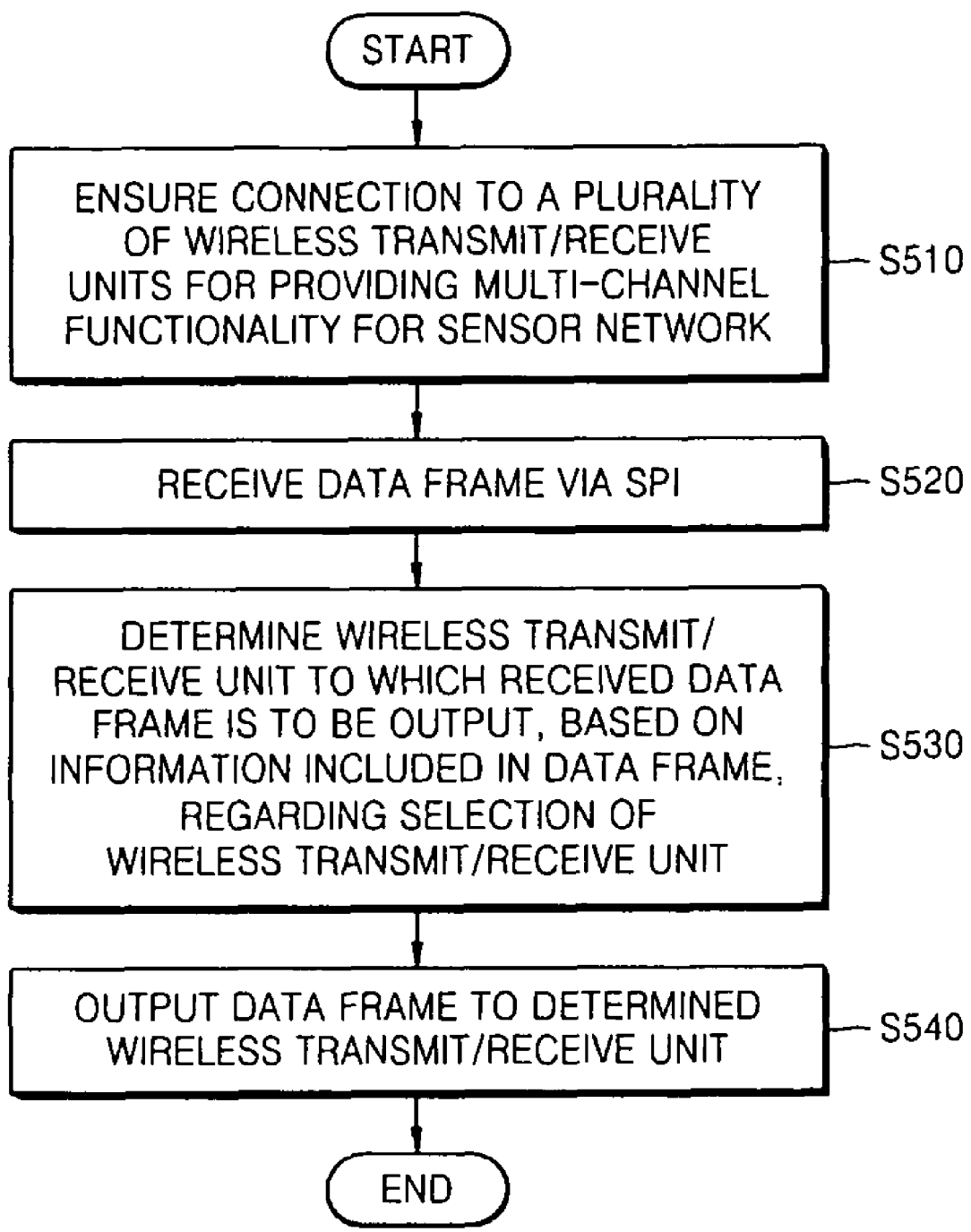

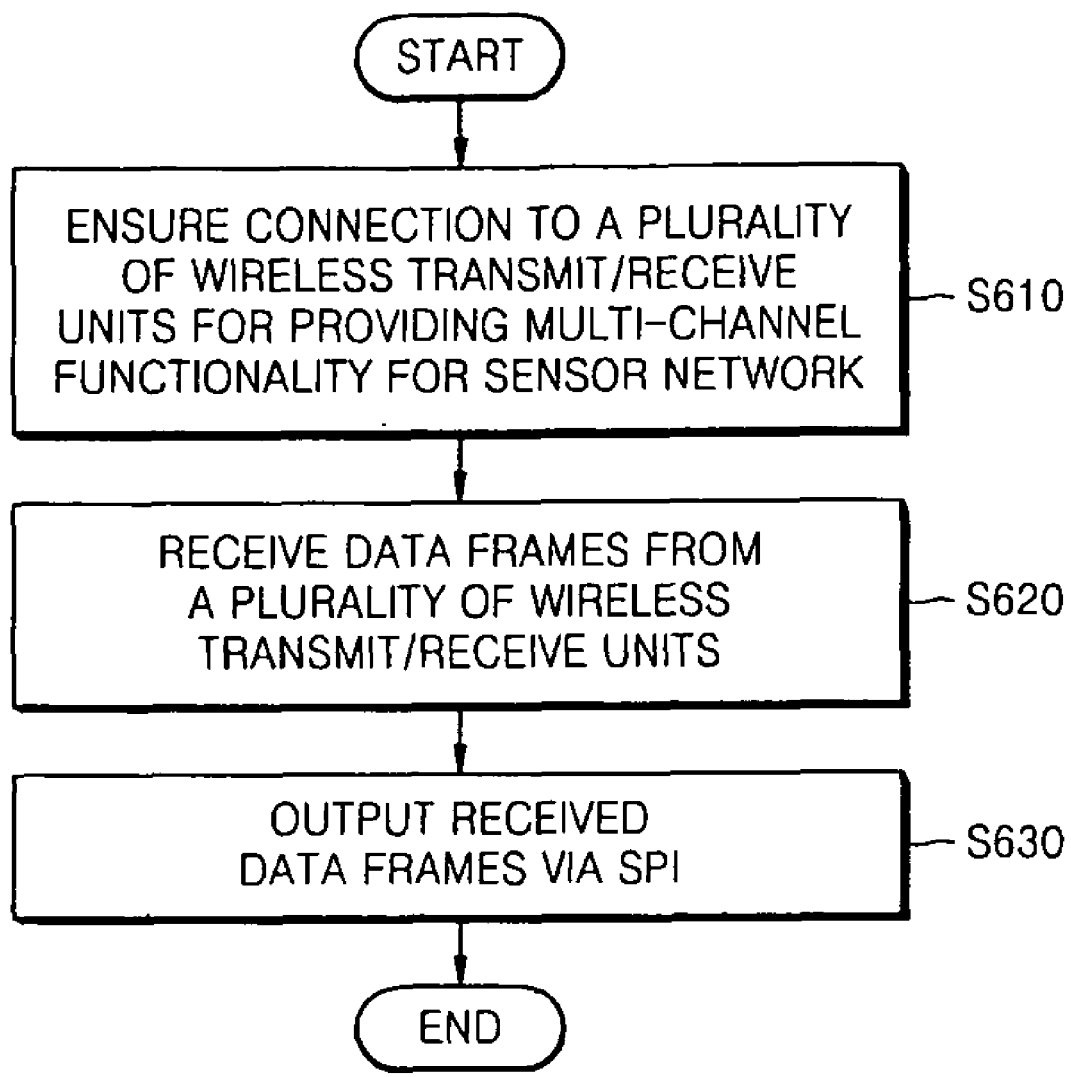

GATEWAY APPARATUS FOR PROVIDING MULTI-CHANNEL FUNCTIONALITY IN SENSOR NETWORK, AND METHOD AND APPARATUS FOR INTERFACING USING SERIAL PERIPHERAL INTERFACE IN THE GATEWAY APPARATUS

CROSS-REFERENCE TO RELATED PATENT APPLICATION

This application claims the benefit of Korean Patent Application No. 10-2007-0126372, filed on Dec. 6, 2007, in the Korean Intellectual Property Office, the disclosure of which is incorporated herein in its entirety by reference.

BACKGROUND OF THE INVENTION

1. Field of the Invention

The present invention relates to a gateway apparatus for providing multi-channel functionality in a sensor network, and a method and an apparatus for interfacing using a serial peripheral interface in the gateway apparatus, and more particularly, to a gateway having a function of interfacing between a core network and a wireless sensor network.

The present invention is derived from a research project supported by the Information Technology (IT) Research & Development (R&D) program of the Ministry of Information and Communication (MIC) and the Institute for Information Technology Advancement (IITA) [project No. 2005-S-038-03, project title: Development of UHF RF-ID and Ubiquitous Networking Technology].

2. Description of the Related Art

When multi-channel functionality is applied in a wireless sensor network, one personal area network (PAN) including clustered sensor nodes can be applied so that the PAN is logically regarded as a plurality of PANs and the PANs are independently applied. When the PANs are applied using a multi-channel, the routing hop count from the sensor nodes to a sink node can be reduced, data can be reliably transmitted, and the power consumption of the sensor nodes can be reduced.

When a gateway is used to be connected to the wireless sensor network in order to apply or use the multi-channel, transceivers, which are each a wireless interface device, directly interface their respective serial peripheral interfaces (SPIs) provided by a micro controller unit (MCU) that is a signal processing unit include in the gateway. In this case, since the MCU can provide a limited number of SPIs, it is not easy to form a gateway for supporting an expanded multi-channel when a multi-channel applied to a sensor network is to be expanded. This is because other transceivers are required for expanding the multi-channel, and the transceivers can directly interface with the MCU only when extra SPIs provided by the MCU are available.

That is, since the MCU can physically provide one SPI or two SPIs, when the transceivers need to interface with the MCU, and the transceivers provide a greater number of channels than that of the SPIs provided by the MCU, a plurality of transceivers can not directly interface the SPIs provided by the MCU.

SUMMARY OF THE INVENTION

The present invention provides a gateway apparatus for providing multi-channel functionality.

The present invention also provides an apparatus for efficiently interfacing using a serial peripheral interface (SPI) in a gateway for providing multi-channel functionality.

The present invention also provides a method for efficiently interfacing using a serial peripheral interface (SPI) in a gateway for providing multi-channel functionality.

According to an aspect of the present invention, there is provided a gateway apparatus comprising: a signal processing unit transmitting and receiving data to and from a core network and including a serial peripheral interface (SPI); a plurality of wireless transmit/receive units transmitting and receiving data to and from a sensor network via their respective communication channels which differ from one another; and an SPI interfacing unit which is connected to the wireless transmit/receive units, which selects a wireless transmit/receive unit to which a data frame received from the signal processing unit via the SPI is to be output from among the wireless transmit/receive units, based on information regarding selection of the wireless transmit/receive unit, wherein the information is contained in the receive data frame, and which outputs data frames received from the wireless transmit/receive units to the signal processing unit via an SPI.

According to another aspect of the present invention, there is provided an SPI interfacing apparatus in a gateway, the apparatus comprising: a distribution unit connected to a plurality of wireless transmit/receive units for providing multi-channel functionality, and outputting a data frame received via an SPI to a wireless transmit/receive unit which is selected from among the wireless transmit/receive units, based on information regarding selection of the wireless transmit/receive unit, wherein the information is contained in the data frame; and a transmission unit connected to the wireless transmit/receive units, and outputting data frames received from the wireless transmit/receive units via an SPI.

According to another aspect of the present invention, there is provided an SPI interfacing method in a gateway apparatus, the method comprising: ensuring connection to a plurality of wireless transmit/receive units for providing multi-channel functionality; receiving a data frame via an SPI; selecting a wireless transmit/receive unit, to which the received data frame is to be output from among the wireless transmit/receive units, based on information regarding selection of the wireless transmit/receive unit, wherein the information is contained in the received data frame; and outputting the received data frame to the selected wireless transmit/receive unit.

According to another aspect of the present invention, there is provided an SPI interfacing method comprising: ensuring connection to a plurality of wireless transmit/receive units for providing multi-channel functionality; receiving data frames from the wireless transmit/receive units; and outputting the received data frames via an SPI.

BRIEF DESCRIPTION OF THE DRAWINGS

The above and other features and advantages of the present invention will become more apparent by describing in detail exemplary embodiments thereof with reference to the attached drawings in which:

FIG. 5 is a flow chart of an SPI interfacing method in a gateway apparatus, according to an embodiment of the present invention; and FIG. 6 is a flow chart of an SPI interfacing method in a gateway apparatus, according to another embodiment of the present invention.

DETAILED DESCRIPTION OF THE INVENTION

Hereinafter, a gateway apparatus for providing multi-channel functionality in a sensor network, and a method and an apparatus for interfacing using a serial peripheral interface (SPI) in the gateway apparatus will be described with regard to exemplary embodiments of the invention with reference to the attached drawings.

Figure 1:
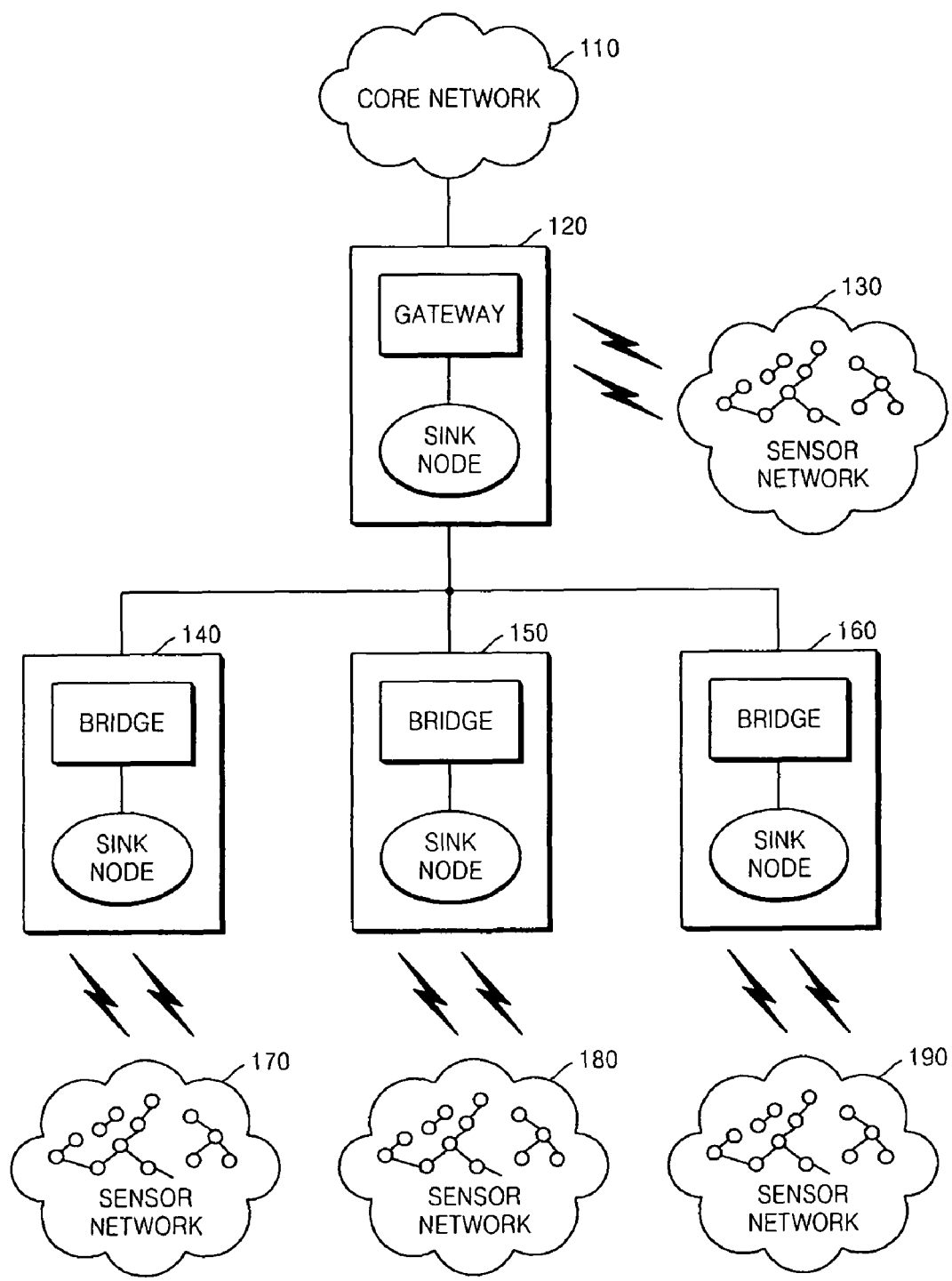
FIG. 1 illustrates an environment to which a gateway is applied, according to an embodiment of the present invention.

FIG. 1 illustrates an environment to which a gateway 120 is applied, according to an embodiment of the present invention.

Referring to FIG. 1, the environment includes a core network 110, the gateway 120, a sensor network 130, bridges 140, 150 and 160, and sensor networks 170, 180 and 190 which are respectively connected to the bridges 140, 150 and 160 via radio frequency (RF) interface.

The core network 110 is a backbone network of a large communication network capable of transferring large-scale data and providing voice and data services over a long distance. For example, the core network 110 may be a public switched telephone network (PSTN), an integrated services digital network (ISDN), international mobile telecommunication 200 (IMT-2000), a wide area network (WAN), a local area network (LAN), or a community antenna television (CATV). In addition, the core network 110 may be an internet protocol (IP)-based IP core network.

The gateway 120 is a functional element or a device that functions so that the core network 110 can transfer information between the gateway 110 and the sensor network 130, and between the gateway 110 and the bridges 140, 150 and 160 by connecting the core network 110 to the sensor network 130 and the bridges 140, 150 and 160. In addition, the gateway 120 functions not only as a simple gateway, but also as a sink node. That is, the gateway 120 is a sink node integrated gateway. Thus, the gateway 120 collects information contained in various sensor nodes included in the sensor network 130, and transmits the information to the core network 110.

The sensor network 130 may be a ubiquitous sensor network (USN), and may also be a wireless sensor network. With regard to the USN, the information can be wirelessly collected by the sensor nodes. In addition, with the wireless sensor network, the sensor network 130 includes the sensor nodes having sensing functions and a sink node that collects the data sensed by the sensor nodes and transmits the data.

The bridges 140, 150 and 160 are respectively connected to the sensor networks 170, 180 and 190 via a wireless communication interface, thereby functioning as respective interfaces between the sensor networks 170, 180 and 190, and the gateway 120. Thus, the bridges 140, 150 and 160 transmit respective data to the gateway 120 via the core network 110 such as an internet protocol (IP) network, wherein the respective data is wirelessly transmitted from sensor nodes included in the sensor networks 170, 180 and 190. Also, the bridges 140, 150 and 160 expand a plurality of personal area networks (PANs) each including sensor nodes so that the PANs may function as one logical PAN.

The bridges 140, 150 and 160 are each a sink node integrated bridge that also functions as a sink node, like in the case of the gateway 120. In addition, each of the bridges 140, 150 and 160 has the same structure as that of the gateway 120, wherein only the application software of each of the bridges 140, 150 and 160 differs slightly from that of the gateway 120.

According to the actual environment to which the gateway 120 is applied, the bridges 140, 150 and 160, and the sensor networks 170, 180 and 190 respectively corresponding to the bridges 140, 150 and 160 may not be required. Alternatively, the numbers of bridges and sensor networks employed may be larger than the numbers of bridges 140, 150 and 160 and sensor networks 170, 180 and 190 shown in the present embodiment.

Figure 2:
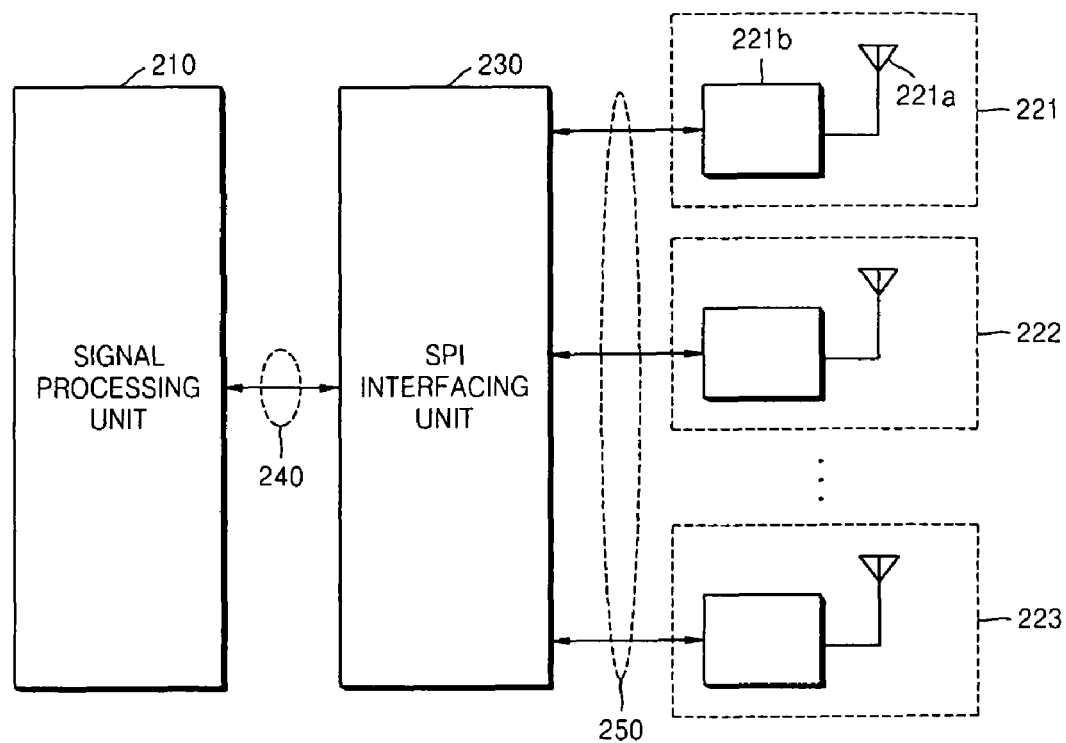
FIG. 2 illustrates a configuration of a gateway according to an embodiment of the present invention.

FIG. 2 illustrates a configuration of a gateway 120 according to an embodiment of the present invention.

Referring to FIG. 2, the gateway 120 according to the current embodiment corresponds to the gateway 120 illustrated in FIG. 1, and includes a signal processing unit 210, a plurality of wireless transmit/receive units 221, 222 and 223, and an SPI interface unit 230.

The gateway 120 includes the wireless transmit/receive units 221, 222 and 223 for providing multi-channel functionality in a sensor network. In addition, the gateway 120 is a sink node integrated gateway that also functions as a sink node collecting information contained in the sensor nodes included in the sensor network 130 from the wireless transmit/receive units 221, 222 and 223 and transmitting the information to the core network 110. Hereinafter, elements of the gateway 120 will now be described.

The signal processing unit 210 receives data from the core network 110, or the like, and outputs a data frame based on the data via an SPI 240, for example, an SPI bus. In addition, the signal processing unit 210 receives a data frame via the SPI 240, and transmits data of the received data frame to the core network 110, or the like. The signal processing unit 210 may include a micro controller unit (MCU) controlling the gateway 120 and a sink node. The MCU controls an application layer, a network layer, a media access control (MAC) layer, a physical layer and the like, which are used for the operation of the sensor network 130. In addition, the MCU may be connected to the SPI interface unit 230 via an MCU SPI bus.

The wireless transmit/receive units 221, 222 and 223 transmit and receive data from and to the sensor network 130 via their respective communication channels which differ from each other. The wireless transmit/receive units 221, 222 and 223 are connected to the SPI interface unit 230 in order to communicate with the signal processing unit 210, and are connected to the sensor nodes of the sensor network 130 via an RF interface for interfacing with the sensor nodes of the sensor network 130.

The wireless transmit/receive unit 221 may include an antenna 221a providing wireless-communication interfacing between the wireless transmit/receive unit 221 and the sensor nodes of the sensor network 130, and a transceiver 221b that is connected to the antenna 221a so as to transmit and receive data to and from the sensor network 130 via the antenna 221a. Since the gateway 120 includes the wireless transmit/receive units 221, 222 and 223, the gateway 120 can support the sensor network 130 so that multi-channel functionality can be applied to the sensor network 130.

The SPI interface unit 230 is connected (250) to the wireless transmit/receive units 221, 222 and 223. In addition, the SPI interface unit 230 selects one wireless transmit/receive unit, to which the data frame received from the signal processing unit 210 via the SPI 240 is to be output, from among the wireless transmit/receive units 221, 222 and 223, based on information regarding the selection of the wireless transmit/receive unit, wherein the information is contained in the received data frame. Then, the SPI interface unit 230 outputs the received data frame to the selected wireless transmit/receive unit, and outputs data frames received from the wireless transmit/receive units 221, 222 and 223 to the signal processing unit 210 via the SPI 240. Likewise, the SPI interface unit 230 performs SPI interfacing between the wireless transmit/receive units 221, 222 and 223 and the signal processing unit 210. Also, the SPI interface unit 230 communicates with the wireless transmit/receive units 221, 222 and 223 by using an SPI interfacing method.

The gateway 120 uses in-band addressing when the wireless transmit/receive unit to which the data frame is to be output is selected from among the wireless transmit/receive units 221, 222 and 223 and information on the address of the selected wireless transmit/receive unit is notified to the SPI interface unit 230.

In the in-band addressing, the address of the selected wireless transmit/receive unit is contained in the data frame, and the SPI interface unit 230 decodes the address of the selected wireless transmit/receive unit so as to transfer the data frame to a predetermined wireless transmit/receive unit, that is, the selected wireless transmit/receive unit. On the other hand, out-band addressing is a method in which the signal processing unit 210 generates a substantial signal which is different from a signal of the data frame, for notifying the SPI interface unit 230 of information on a predetermined wireless transmit/receive unit which is to receive the data frame.

Figure 3:
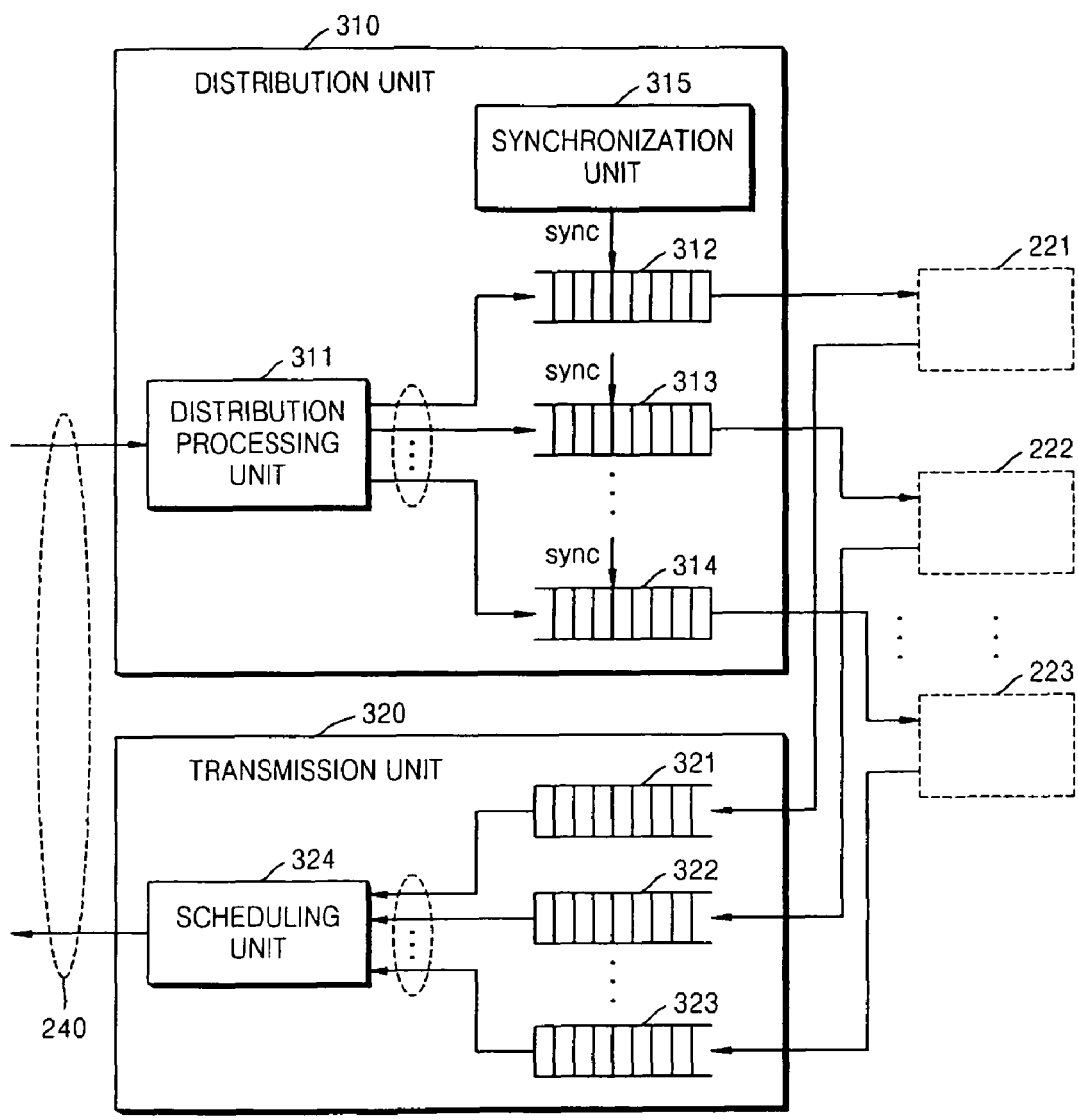
FIG. 3 illustrates a configuration of a serial peripheral interface (SPI) interface apparatus according to an embodiment of the present invention.

FIG. 3 illustrates a configuration of an SPI interface apparatus according to an embodiment of the present invention.

Referring to FIG. 3, the SPI interface apparatus corresponds to the SPI interface unit 230 illustrated in FIG. 2, and includes a distribution unit 310 and a transmission unit 320.

The distribution unit 310 is connected to the wireless transmit/receive units 221, 222 and 223 for providing multi-channel functionality, receives a data frame from the signal processing unit 210 via the SPI 240, and outputs the received data frame to one wireless transmit/receive unit selected from among the wireless transmit/receive units 221, 222 and 223, based on information regarding selection of the wireless transmit/receive unit, wherein the information is contained in the received data frame.

The distribution unit 310 may include a distribution processing unit 311, a plurality of transmission first-in first outs (FIFOs) 312, 313 and 314, and a synchronization unit 315.

The distribution processing unit 311 outputs the received data frame towards a wireless transmit/receive unit that is selected based on the information regarding the selection of the wireless transmit/receive unit, wherein the information is contained in the received data frame. The distribution processing unit 311 may include a switch for changing the course or flow of a circuit. The switch allows the distribution processing unit 311 to be connected to one transmission FIFO selected from among the transmission FIFOs 312, 313 and 314 so that the received data frame can be transmitted to the transmission FIFO connected to the wireless transmit/receive unit selected based on the information regarding the selection of the wireless transmit/receive unit.

The data frame received by the distribution unit 310 may include a transmit/receive unit selection field for selecting the wireless transmit/receive unit to which the data frame is to be transmitted. As a result, the information regarding the selection of the wireless transmit/receive unit is included in the transmit/receive unit selection field. According to contents of the transmit/receive unit selection field, the distribution processing unit 311 selects one transmission FIFO, which is to be connected to the distribution processing unit 311, from among the transmission FIFOs 312, 313 and 314.

The transmission FIFOs 312, 313 and 314 are respectively connected to the wireless transmit/receive units 221, 222 and 223, and receive a data frame output from the distribution processing unit 311 to transmit the data frame to respective wireless transmit/receive units 221, 222 and 223.

The synchronization unit 315 transmits a synchronization signal to the transmission FIFOs 312, 313 and 314 so as to synchronize data frame transmission operated by the transmission FIFOs 312, 313 and 314.

The operation of the distribution unit 310 will now be described in detail. A wireless transmit/receive unit selection field included in data frame header contained in a data frame received by the distribution processing unit 311 is analyzed. Then, the data frame is transferred to one transmission FIFO connected to one wireless transmit/receive unit that is selected from among the wireless transmit/receive units 221, 222 and 223 according to the analysis result. When the data frame is stored in the selected transmission FIFO by the distribution processing unit 311, the stored data frame is transmitted to the selected wireless transmit/receive unit according to a synchronization controlling signal transmitted by the synchronization unit 315.

The transmission unit 320 is connected to the wireless transmit/receive units 221, 222 and 223, and receives data frames from the wireless transmit/receive units 221, 222 and 223 to output the data frames in order by using an SPI interfacing method.

The transmission unit 320 may include a plurality of receive FIFOs 321, 322 and 323 and a scheduling unit 324.

The receive FIFOs 321, 322 and 323 are respectively connected to the wireless transmit/receive units 221, 222 and 223, and receive data frames from respective wireless transmit/receive units 221, 222 and 223.

The scheduling unit 324 checks the states of the receive FIFOs 321, 322 and 323, and then outputs the data frames input to the receive FIFOs 321, 322 and 323 via the SPI 240 by using round-robin scheduling or according to the priority order of the data frames. When the data frames are output, if the signal processing unit 210 is one MCU, the data frames are output to an SPI bus of the MCU.

The transmission FIFOs 312, 313 and 314, and the receive FIFOs 321, 322 and 323 are each a FIFO. The FIFO is generally used in an electrical circuit in order to control buffering and flowing. The FIFO is formed in the form of hardware, and includes a group of reading and writing pointers, a storage, and a control logic. The storage may be a static random access memory (SRAM), a flip-flop, a latch or the like.

Figure 4A:
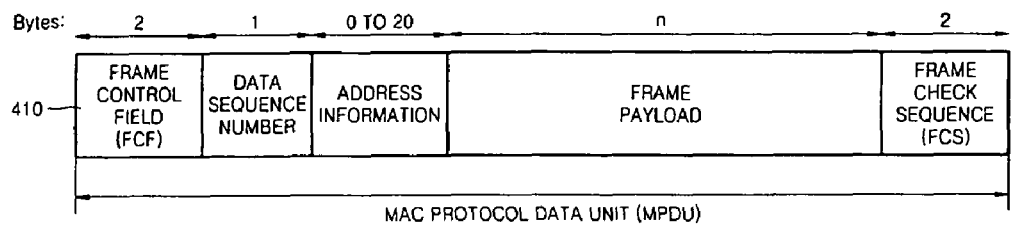
FIG. 4A illustrates a configuration of a data frame transferred using a conventional SPI interfacing method.

FIG. 4A illustrates a configuration of a data frame transferred using a conventional SPI interfacing method.

Referring to FIG. 4A, an SPI data frame transmitted by using the conventional SPI interfacing method in a gateway, which is connected to a sensor network and functioning as a sink node and a gateway, may include fields such as frame control field(FCF) 410, data sequence number, address information, frame payload, and frame check sequence(FCS). Accordingly, the SPI data frame of MAC protocol data unit (MPDU) does not contain information regarding the selection of a wireless transmit/receive unit to which the SPI data frame is to be transmitted.

In this regard, the MPDU is a protocol data unit required when data is transmitted to a lower layer in order to transmit the data from a message communication system to another message communication system.

Figure 4B:
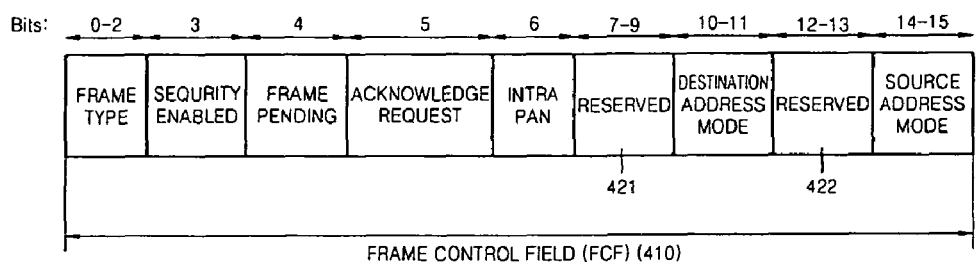
FIG. 4B illustrates a configuration of a conventional frame control field(FCF) of MAC protocol data unit transferred between a gateway and an SPI interface apparatus.

FIG. 4B illustrates conventional bit fields of frame control field(FCF) 410 of MPDU between a gateway and an SPI interface apparatus.

The conventional bit configuration of frame control field (FCF) 410 includes frame type, security enabled, frame pending, acknowledged request, intra PAN, destination address mode, source address mode, and two reserved fields 421 and 422.

Figure 4C:
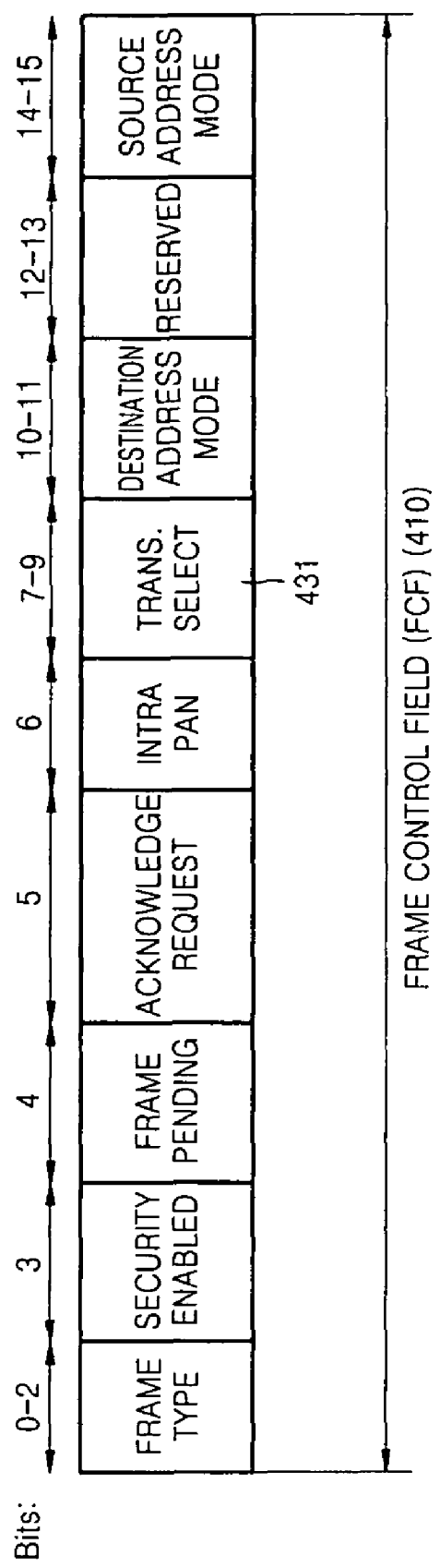
FIG. 4C illustrates a configuration of a frame control field (FCF) of MAC protocol data unit for transceiver selection between a gateway and an SPI interface apparatus according to an embodiment of the present invention.

FIG. 4C illustrates the modified bit fields of frame control field(FCF) 410 in which a reserved field 431 of bit 7 to 9 for transceiver selection is employed according to an embodiment of the invention.

That is, unlike in the case of the frame control field(FCF) illustrated in FIG. 4B, the frame control field(FCF) illustrated in FIG. 4C—thus the SPI data frame—includes the field of TRANS. SELECT 431 for selecting one transceiver from among a plurality of transceivers providing multi-channel functionality.

As described above, the distribution processing unit 311 illustrated in FIG. 3 analyzes the field of the TRANS. SELECT 431 and transmits a data frame to the transmission FIFO connected to the wireless transmit/receive unit selected from among the wireless transmit/receive units 221, 222 and 223 according to the analysis result.

FIG. 5 is a flow chart of an SPI interfacing method in a gateway apparatus, according to an embodiment of the present invention. The detailed description will be described with reference to FIGS. 2 and 3.

Referring to FIG. 5, an SPI interface unit 230 illustrated in FIG. 2 or the SPI interface apparatus illustrated in FIG. 3 ensures the connection between the SPI interface unit 230 or the SPI interface apparatus and the wireless transmit/receive units 221, 222 and 223 for providing multi-channel functionality (S510). A data frame is received via an SPI (S520). One wireless transmit/receive unit to which the received data frame is output is selected from among the wireless transmit/receive units 221, 222 and 223, based on information regarding the selection of the wireless transmit/receive unit, wherein the information is contained in the received data frame (S530). The received data frame is output to the selected wireless transmit/receive unit (S540).

FIG. 6 is a flow chart of an SPI interfacing method in a gateway apparatus, according to another embodiment of the present invention.

Referring to FIG. 6, the SPI interface unit 230 illustrated in FIG. 2 or the SPI interface apparatus illustrated in FIG. 3 ensures the connection between the SPI interface unit 230 or the SPI interface apparatus and the wireless transmit/receive units 221, 222 and 223 for providing multi-channel functionality (S610). Then, data frames are received from the wireless transmit/receive units 221, 222 and 223 (S620). The received data frames are output in a predetermined order via an SPI (S630) by using round-robin scheduling or according to the priority order of the data frames.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the above embodiments, by virtue of an SPI interface apparatus for interfacing between an SPI interface provided by a signal processing unit and a plurality of wireless transmit/receive units, and a gateway apparatus including the SPI interface apparatus, it is easy to expand a multi-channel when multi-channel functionality is applied to a sensor network. That is, when required, a channel can easily be expanded by connecting the SPI interface apparatus to other wireless transmit/receive units.

When the gateway apparatus transmits data received from the sensor network via a multi-channel to a core network, or the like, the received data is converged into one signal processing unit included in a gateway apparatus. In order to overcome this problem, according to the above embodiments, the SPI interface of the signal processing unit has an increased bandwidth for transmitting data, thereby reducing the delay and loss of data.

Moreover, according to the above embodiments, the signal processing unit can select one wireless transmit/receive unit by using in-band addressing.

In addition, the wireless transmit/receive units support the sensor network so that multi-channel functionality can be applied to the sensor network, thereby reducing the hop count of data transmission of sensor nodes included in the sensor network and improve the reliability of data transmission.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A gateway apparatus comprising:
    a signal processing unit transmitting and receiving data to and from a core network and including a serial peripheral interface (SPI);
    a plurality of wireless transmit/receive units transmitting and receiving data to and from a sensor network via their respective communication channels which differ from one another; and
    an SPI interfacing unit which is connected to the wireless transmit/receive units, which selects a wireless transmit/receive unit to which a data frame received from the signal processing unit via the SPI is to be output from among the wireless transmit/receive units, based on information regarding selection of the wireless transmit/receive unit, wherein the information is contained in the receive data frame, and which outputs data frames received from the wireless transmit/receive units to the signal processing unit via an SPI,
    wherein the SPI interfacing unit comprises:
    a distribution processing unit outputting the data frame received from the signal processing unit towards the selected wireless transmit/receive unit based on the information regarding the selection of the wireless transmit/receive unit; and
    a plurality of transmission first-in first-outs (FIFOs) respectively connected to the wireless transmit/receive units, wherein one of the plurality of transmission FIFOs receives the data frame output from the distribution processing unit and outputs the data frame to the selected wireless transmit/receive unit.

2. A gateway apparatus comprising:

a signal processing unit transmitting and receiving data to and from a core network and including a serial peripheral interface (SPI);

a plurality of wireless transmit/receive units transmitting and receiving data to and from a sensor network via their respective communication channels which differ from one another; and an SPI interfacing unit which is connected to the wireless transmit/receive units, which selects a wireless transmit/receive unit to which a data frame received from the signal processing unit via the SPI is to be output from among the wireless transmit/receive units, based on information regarding selection of the wireless transmit/receive unit, wherein the information is contained in the receive data frame, and which outputs data frames received from the wireless transmit/receive units to the signal processing unit via an SPI, wherein the SPI interfacing unit comprises:

a plurality of receive FIFOs respectively connected to the wireless transmit/receive units, and receiving data frames from respective wireless transmit/receive units; and a scheduling unit outputting the data frames received by the receive FIFOs to the signal processing unit by using round-robin scheduling or according to a priority order of the data frames.

3. An SPI interfacing apparatus in a gateway, the apparatus comprising:

a distribution unit connected to a plurality of wireless transmit/receive units for providing multi-channel functionality, and outputting a data frame received via an SPI to a wireless transmit/receive unit which is selected from among the wireless transmit/receive units, based on information regarding selection of the wireless transmit/receive unit, wherein the information is contained in the data frame; and a transmission unit connected to the wireless transmit/receive units, and outputting data frames received from the wireless transmit/receive units via an SPI, wherein the distribution unit comprises:

a distribution processing unit outputting the data frame received by the distribution unit towards the selected wireless transmit/receive unit based on the information regarding the selection of the wireless transmit/receive unit; and a plurality of transmission first-in first-outs (FIFOs) respectively connected to the wireless transmit/receive units, wherein one of the transmission FIFOs receives the data frame output from the distribution processing unit and outputs the data frame to the selected wireless transmit/receive unit.

4. The apparatus of claim 3, wherein the distribution unit further comprises a synchronization unit synchronizing data frame transmission operated by the transmission FIFOs.

5. The apparatus of claim 3, wherein the distribution processing unit comprises a switch connecting the distribution processing unit to a transmission FIFO selected from among the transmission FIFOs, based on the information regarding the selection of the wireless transmit/receive unit.

6. An SPI interfacing apparatus in a gateway, the apparatus comprising:

a distribution unit connected to a plurality of wireless transmit/receive units for providing multi-channel functionality, and outputting a data frame received via an SPI to a wireless transmit/receive unit which is selected from among the wireless transmit/receive units, based on information regarding selection of the wireless transmit/receive unit, wherein the information is contained in the data frame; and a transmission unit connected to the wireless transmit/receive units, and outputting data frames received from the wireless transmit/receive units via an SPI, wherein the transmission unit comprises:

a plurality of receive FIFOs respectively connected to the wireless transmit/receive units, and respectively receiving data frames from the wireless transmit/receive units; and a scheduling unit outputting the data frames received by the receive FIFOs by using round-robin scheduling or according to the priority order of the data frames.

* * * * *